Jan. 7, 1930.  H. P. SMITH  1,743,049
LAMINATED SPRING
Filed Aug. 7, 1928
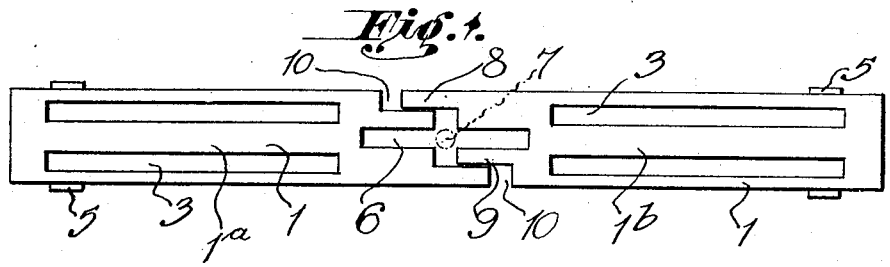
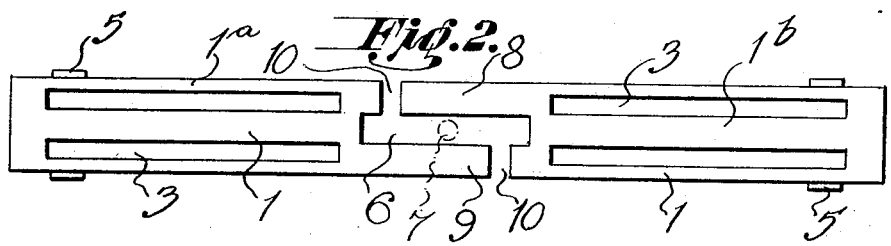
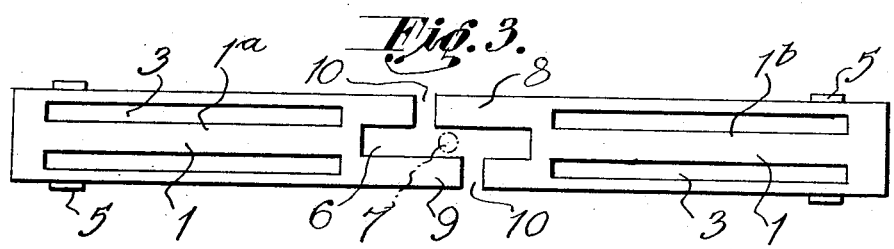
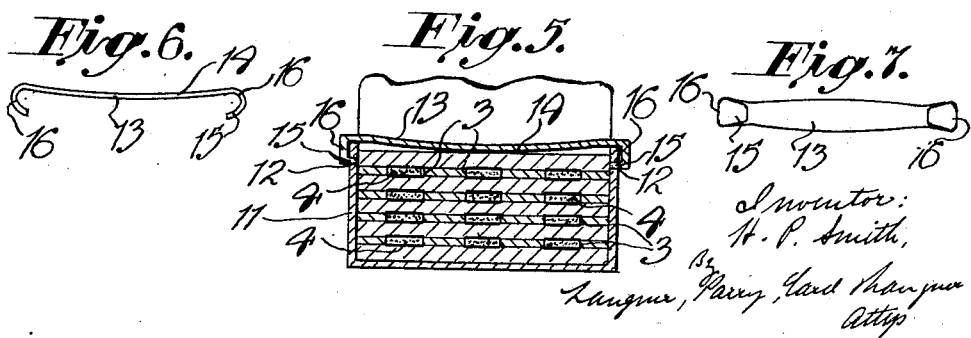
Inventor:
H. P. Smith,
By Langner, Parry, Card & Langner
Attys Patented Jan. 7, 1930

1,743,049

UNITED STATES PATENT OFFICE

HUGH PITCAIRN SMITH, OF SPREYTON, TASMANIA, AUSTRALIA

LAMINATED SPRING

Application filed August 7, 1928. Serial No. 298,064.

This invention relates to improvements in and relating to laminated springs and has been devised in order to provide an efficient means for holding the leaves at the centre and also in plates disposed between the leaves and having absorbent lubricating pads therein, the said plates being so constructed and arranged that they are adapted to be accommodated to laminated springs of varying lengths.

An essential feature embodied in the invention consists in the use of a spring clip or stirrup for holding the leaves of the spring at the centre.

A further essential feature embodied in the invention consists in dividing plates carrying lubricant soaked pads in two parts spaced from each other, a portion of the one part overlapping a portion of the other part at the centre of the spring, the parts being adapted to be moved towards or away from each other so as to be accommodated to different lengths of springs.

By forming the plates between the leaves in this way the commercial application of plates carrying lubricant soaked pads is readily effected and laminated springs constructed and arranged in this way will be of great utility not only with respect to the adequate and automatic lubrication thereof, but also provides that the plates cause the dampening of the movement on each rebound.

In order that the invention may be more readily understood it will now be described with reference to the accompanying drawings in which:—

Figure 1 is a view of a divided lubricant pad carrying plate constructed according to this invention.

Figures 2 and 3 illustrate modifications thereof.

Figure 4 is a view in side elevation of a laminated spring fitted with the lubricating plates.

Figure 5 is a view in cross section illustrating a spring clip fastening a stirrup holding the leaves of the spring at the centre.

Figures 6 and 7 illustrate the preferred form of spring clip and stirrup employed for holding the leaves of the spring.

According to this invention a laminated leaf spring of semi-elliptic type is illustrated in Figure 4 and is provided with plates 1 disposed between the leaves within the upper and lower leaves of the spring.

These plates 1 are slotted in any suitable way but preferably as illustrated at 3 in Figures 1, 2 and 3 and these slots receive absorbent pads 4 which are dipped in a suitable lubricating substance.

These pads 4 are preferably somewhat greater in thickness than the slots 3 so that when the leaves of the spring are pressed together during the compression of the spring the lubricant is expressed from the absorbent pads and evenly distributed over the surface of the leaves of the spring.

Lugs 5 are preferably formed at the sides of the plates 1 which engage with the edges of the leaves 2 of the spring and prevent any sidewise or twisting movement of said plates during the action of the spring.

In the construction illustrated in Figures 1, 2 and 3, the plates 1 are preferably formed of mild steel and are centrally slotted at 6 and through this slot the central bolt 7 passes, the slot 6 being elongated as illustrated and forms part of the division of the plate 1 which is formed in two portions 1ª and 1ᵇ, each portion respectively having members 8, 9 overlapping each other and projecting respectively in opposite directions past the bolt centre 6.

The portions 1ª and 1ᵇ are normally spaced from each other as at 10 and are formed with the slots 3 to receive the absorbent lubricant soaked pads above described.

By constructing the plates 1 in this way means are provided for the longitudinal adjustment of the said plates 1, so that they may be brought closer together or moved away from each other to conform to the lengths of different sizes or makes of laminated springs.

In lieu of the central holding bolt 7 the leaves of the spring may be held at the centre by a stirrup 11 formed with holes 12 on the upper ends of each stirrup arm. These holes 12 receive a spring clip 13 curved as at 14 so that when the looped ends 15 enter the holes 12 and the portions 16 are tapped, the ends 15 pass further into the holes 12 of the stirrup 11 and form effective fastening element.

The spring clip 13 is preferably formed of spring steel of the shape illustrated in Figures 6 and 7.

I desire it to be understood that improvements and modifications may be embodied without departing from the spirit and scope of the invention.

What I claim as my invention and desire to secure by Letters Patent is:—

1. A laminated spring characterized in that plates carrying lubricating pads are disposed between the leaves, the lubricating plates being divided at the centre and spaced from each other, each plate being provided with an extension overlapping the central bolt or holder of the spring for the purposes specified.

2. A laminated spring characterized in that lubricating plates fitted with absorbent pads are disposed between the leaves of the spring, a central elongated pathway around the central bolt, the plates being formed in two portions, each portion having members overlapping each other and projecting respectively in opposite directions past the centre of the spring for the purposes specified.

Signed at Sydney, New South Wales, Australia, this 7th day of June A. D. 1928.

HUGH PITCAIRN SMITH.